US006545066B1

(12) United States Patent
Immordino, Jr. et al.

(10) Patent No.: US 6,545,066 B1
(45) Date of Patent: Apr. 8, 2003

(54) LIGHTWEIGHT READY-MIX JOINT COMPOUND

(75) Inventors: Salvatore C. Immordino, Jr., Trevor, WI (US); Charles J. Miller, McHenry; Scott A. Cimaglio, Gurnee, both of IL (US); David Pickles, Langley (CA)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 09/724,736

(22) Filed: Nov. 28, 2000

(51) Int. Cl.$^7$ ............... C08J 9/32; C04B 16/08; C08K 3/26
(52) U.S. Cl. ............ 523/218; 524/158; 524/423; 524/425; 524/493; 106/602
(58) Field of Search ............ 523/218; 524/158, 524/423, 425, 493; 106/602

(56) References Cited

U.S. PATENT DOCUMENTS

| | | |
|---|---|---|
| 3,961,978 A | 6/1976 | Brodmann |
| 4,252,568 A | 2/1981 | Bounini |
| 4,286,995 A | 9/1981 | Smith et al. |
| 4,305,901 A * | 12/1981 | Prince et al. |
| 4,722,943 A | 2/1988 | Melber et al. |
| 4,824,879 A * | 4/1989 | Montgomery et al. |
| 5,078,792 A * | 1/1992 | Hinkle et al. |
| 5,342,689 A | 8/1994 | Melber et al. |
| 5,498,645 A * | 3/1996 | Mariano et al. |
| 5,506,280 A * | 4/1996 | Miller et al. |
| 5,653,797 A | 8/1997 | Patel |
| 5,731,057 A * | 3/1998 | Montoya |
| 5,779,786 A | 7/1998 | Patel |
| 6,036,869 A * | 3/2000 | Selvarajan et al. |

FOREIGN PATENT DOCUMENTS

| WO | 95/26323 | * 10/1995 |
|---|---|---|
| WO | WO 00/37547 | 6/2000 |

* cited by examiner

Primary Examiner—Tae H. Yoon
(74) Attorney, Agent, or Firm—Greer, Burns & Crain, Ltd.; David F. Janci; John M. Lorenzen

(57) ABSTRACT

The joint compound of the present invention utilizes hollow resin microspheres with a mean particle size less than 75 microns and exhibiting no more than 1.5% increase in density under high shear stress testing.

18 Claims, No Drawings

LIGHTWEIGHT READY-MIX JOINT COMPOUND

CROSS REFERENCE TO RELATED APPLICATIONS

This application relates to application U.S. Ser. No. 09/724,674, now U.S. Pat. No. 6,476,099, for A Joint Compound Additive for Reduction of Cracking, Cratering and Shrinking, filed concurrently herewith.

BACKGROUND OF THE INVENTION

This invention relates to a composition for a joint compound for use in filling and coating the joints between adjacent panels of gypsum wallboard. More specifically, it relates to a composition for lightweight joint compound of the drying type that reduces applicator fatigue, job completion time, and reduces shipping costs of the packaged product.

In the construction of buildings, one of the most common elements is gypsum wallboard, often known as drywall, used in the construction of walls and/or ceilings. Walls made from gypsum wallboard are traditionally constructed by affixing the panels to wood studs or metal framing, and treating the joints between adjoining panels with a specially prepared adhesive called a joint compound. The side edges of the drywall panels are tapered, thus allowing the joint compound to be applied to the seam, between adjoining panels, in such a way that a monolithic surface is created when finished. This process generally proceeds by placing a taping joint compound within the joint formed by the abutted edges of the wallboards, and embedding a liquid-permeable paper or fiberglass tape within that compound. When dry (or set), a second coating referred to as a topping joint compound is applied over the joint, which may be subsequently lightly sanded upon drying. A third or finish coat is applied, allowed to dry, and lightly sanded to create a smooth monolithic surface that conceals any indication of where the drywall seams were. Another type of joint compound is an all-purpose grade that may be used for both embedding the joint tape and for applying the finish coats. A patterned or textured effect may be given to the finished wall and joint through the use of special application tools.

There are several categories of joint compounds. Drying type compounds cure through the evaporation of water, whereas setting type joint compounds chemically react with water during the curing process. Setting type joint compounds typically use calcium sulfate hemihydrate, also known as stucco or plaster of Paris, as a base. When water is added to the setting type powder, it reacts with the calcium sulfate hemihydrate via a hydration reaction to form an interlocking matrix of calcium sulfate dihydrate crystals. The interlocking crystal matrix gives the compound increased strength. The benefit of a setting type joint compound over a drying type is the overall strength of the finished joint, resulting in less shrinking and cracking, as well as an independence from having to wait for the joint compound to be completely dry prior to further finishing. Drying type joint compounds have the advantage of ease of use, as they typically come in a ready mixed form, with water being added and mixed by the manufacturer. A third type of joint compound combines the setting action of a calcium sulfate hemihydrate based compound with the ease of use of a ready mixed compound. The properties of a ready mixed setting type joint compound are taught in U.S. Pat. No. 5,746,822, incorporated herein by reference.

Lightweight joint compounds are known in the art, such as U.S. Pat. No. 4,454,267 to Williams and U.S. Pat. No. 4,657,594 to Struss. Perlite, which is a form of glassy rock similar to obsidian, is ground, heat expanded, and immediately surface treated with a silicone-based compound to provide lightweight filler for use in a joint compound. The special treatment renders the expanded perlite water-insensitive so that it does not soak up water due to capillary action. Despite the water-insensitivity of coated perlite, it still requires a certain amount of available water to wet out and disperse. Use of large amounts of perlite negatively impacts the overall water demand, drying time, strength, bond, viscosity and surface absorption characteristics of the joint compound. The expanded perlite is also susceptible to breakdown during mixing that may further degrade the physical properties of the joint compound.

U.S. Pat. No. 4,824,879 to Montgomery, et al. teaches the addition of expanded perlite or hollow glass microspheres to reduce density and shrinkage in a joint compound. As recited above, there is a limit as to the amount of perlite that may be used in a joint compound without deterioration of certain physical properties. Glass microspheres may be used, however, they are prone to breakage. When microspheres break open, they greatly increase the density of the resultant joint compound due to the filling of the void left behind by the broken sphere with water and other additives. The glass then tends to settle, and is difficult to disperse thereby leading to an unfavorable change in rheological properties. Whenever breakage occurs, more microspheres must be added to make up for the increase in density, in turn, increasing the cost of the formulation. Glass and perlite are also disadvantageous because of the dust that can be produced. Glass microspheres are limited in size and density. These limitations require a greater amount be added to the formulation in order to lower the overall density.

The use of polyacrylate microspheres in a setting type joint compound is taught in U.S. Pat. No. 5,494,947 to Kaplan. This reference is directed to a joint compound to be used in prefabricated walls and ceilings that remain flexible after set, thereby minimizing cracking during transportation and final assembly of the prefabricated unit. The surface chemistry of these polyacrylate resins is such that it tends to stick to itself rather than disperse readily in water, making it difficult to disperse in an aqueous medium typically resulting in the formation of unacceptable clumps.

It is, therefore, an object of this invention to provide an improved lightweight joint compound with a final use density less than the density of water.

It is also an object of this invention to provide an improved lightweight joint compound that provides a smooth finished surface.

It is yet another object of this invention to provide an improved lightweight joint compound utilizing microspheres which are minimally susceptible to breakage during manufacture and end use.

It is still another object of this invention to provide an improved lightweight joint compound utilizing microspheres that readily disperse in an aqueous medium.

BRIEF DESCRIPTION OF THE INVENTION

The above-listed objects are met or exceeded by the present invention that features hollow resin microspheres as filler in lightweight joint compound. Densities less than that of water are obtainable using the formulation of the present invention. Use of the resin microspheres at the same weight percentage as glass microspheres provides a greater change in density due to the much lower density of the resin versus the glass. Resin microspheres also avoid a reported adverse interaction when glass microspheres are used with polyvinyl alcohol, that causes the joint compound to stiffen or gel.

More specifically, the joint compound of the present invention comprises at least one binder and one or more fillers, with at least one filler including hollow resin microspheres with a mean particle size less than 75 microns and exhibiting no more than 1.5% increase in density under high shear testing. Use of hollow resin microspheres as lightweight filler provides for a formulation of an extremely light joint compound with a density less than water, and that does not exhibit a grainy surface when applied over drywall, while improving the application properties. The microspheres blend easily with other ingredients, particularly when added in a pre-wet form, also known as a cake.

Resin microspheres have a density much lower than that of glass microspheres. Because of this lower density, fewer resin microspheres are required to get the same change in resultant volume compared to glass microspheres. This allows preparation of very lightweight joint compounds without adversely affecting other properties of the joint compound.

DETAILED DESCRIPTION OF THE INVENTION

In the following discussion, all percentages indicated are calculated as the weight of all solids on a dry basis.

The lightweight joint compound of the present invention includes a binder and one or more fillers, including hollow resin microspheres with a mean particle size less than 75 microns and exhibiting no more than 1.5% increase in density under high shear testing. A preferred embodiment uses acrylonitrile resin microspheres in a joint compound of either the setting or the drying type.

Preferably, the joint compound is made up of the binder, fillers, thickeners, preservatives and dispersing agents. Traditional joint compounds, as well as lightweight joint compounds may benefit from the formulation of the present invention. Many optional ingredients are suitable for addition to the joint compound depending on the exact use and desired properties of the joint compound.

Any binder that is suitable for use in a joint compound is appropriate for use in the present invention. The binder is used to enhance the adhesion of the joint compound to its substrate, typically drywall. Acceptable binders include, but are not limited to latex emulsions, vinyl acetates, acrylics, alcohols, and dispersible powders such as poly vinyl acetate, ethylene vinyl acetates, and starches. Latex binders are preferred in the present invention. The concentration of the latex binder in a typical joint heavyweight compound ranges from about 1% to about 2.5% of the total wet weight. The concentration of binder in a typical lightweight point compound ranges from 1% to about 3%. The concentration of binder in the present invention is usually slightly higher compared to previous lightweight joint compounds to compensate for the additional drop in density and its effect on maintaining acceptable adhesion properties. In the present invention, the concentration of the latex binder ranges from about 1% to about 3.5%.

The key ingredient in the joint compound of the present invention is hollow resin microspheres that meet certain physical properties. Preferred shell resins suitable for use in the present invention are homopolymers, copolymers, or blends of homopolymers and/or copolymers formed one or more of acrylonitrile ("ACN"), vinylidene chloride ("VDC"), or methyl methacylate ("MMA") monomers. Particularly preferred resins are polyacrylonitrile ("PACN"), polyvinylidene chroide ("PVDC"), copolymors formed from ACN and VDC, and copolymers found from ACN, VDC, and MMA. The microspheres demonstrate high resiliency to compression without collapse (non-friable) and are able to withstand the exerted shear stress (shear-stability) of a typical joint treatment manufacturing process and subsequent customer preparation. A standard suspension of microspheres in a thickened aqueous solution, followed by high shear mixing at 14,000 RPM in a HAMILTON BEACH® Model number 930 commercial drink mixer for eight minutes, simulates the stress placed upon the microspheres during manufacture.

The preferred density of the microspheres is about 0.009 to about 0.13 g/cc. Microspheres in this density range have an optimal effect on increasing the overall volume of the joint compound. However, they are still heavy enough to allow measurement and addition of the microspheres by weight.

A homogeneous dispersion of microspheres in water is important to achieving a smooth, uniform surface of the finished joint compound. If the microspheres do not disperse properly, an unacceptable lumpy texture results. Resins microspheres that are difficult to disperse also increase joint compound preparation time. In some manufacturing situations where undispersed microspheres are present, the joint compound manufacturing efficiency is reduced and unit cost is increased.

The particle size of the microspheres is preferably small enough that there is no noticeable difference in the surface texture of the finished joint compound compared to traditional blends. Generally, this means that the microspheres have a mean diameter less than 75 microns. If the particles are too small, the surface to volume ratio will reduce the microspheres' ability to lower overall density. The preferred range of microsphere particle size is from about 25 to 55 microns in diameter.

The microspheres are also strong enough that very few will break under mixing conditions observed during manufacturing. When acting to reduce the weight of the joint compound, the microspheres succeed only as long as they remain intact. When they break, they collapse and allow liquids, along with other heavier materials, to occupy the void left behind. The joint compound itself then condenses, and a loss of volume is observed along with an increase in density. Breakage is detectable by comparing the calculated theoretical density, taking into account some entrained air, to the actual density of the mixture. If the microspheres collapse during the manufacturing process, the density of the resultant joint compound will increase, requiring that even more spheres be added to make up for the loss in volume and increase in density. Selective use of microspheres that are non-friable and shear stable helps prevent breakage and collapse which are usually marked by an increase in the joint compound density, a decrease in overall expected volume, and lower product yield.

A number of different stresses are present during the preparation of the joint compound that cause microsphere collapse. The greatest strain on microsphere integrity is during the manufacture of joint compound, where stresses caused by the shear force of mixing and pressures during material transfer lead to a compromise of the microsphere shell wall. Resin type, sphere size, shell thickness, and chemical environment are all factors involved in the ability of the microsphere to withstand processing and end use stresses.

In order to be suitable for use in the present invention, resin microsphere collapse, as measured by an increase in product density, is limited to no more than 1.5% increase in density under high stress testing. For the purposes of this invention, under one such test, the microspheres are suspended in a solution of water, a defoamer and a hydrous magnesium silicate, such as LAPONITE® RD (Southern Clay Products, Inc. Gonzolas, Tex.). The defoamer used for this test was HiMar D-829 (Rainbow Chemicals, Inc., Lake Bluff, Ill.). Mixing of the standard suspension with a HAMILTON BEACH® Model number 930 high-speed commercial drink mixer for up to eight minutes simulates the stress placed upon the microspheres during manufacture. High shear conditions are created by mixing the suspended hollow resin microspheres at 14,000 rpm. The mixer is equipped with a ½" diameter spindle 6½" in length. At the bottom of the spindle is a four-fold agitator button, measuring 1½" from vane tip to vane tip when fully extended. A solid, 1" disk agitator is located 1¼"up the spindle from the agitator button. The standard solution was poured into a stainless steel cup, 6¾" deep and mixed for eight minutes.

The suspension containing a suspending agent is needed because the microspheres low density leads to immediate separation in most solvents, making density measures impractical. A synthetically made hydrous magnesium silicate creates a highly thixotropic solution when prepared in water, with excellent suspending power, preventing the lightweight microspheres from floating to the top and separating. In addition to the use of hydrous magnesium silicate as a suspension aid, a defoaming agent is used to minimize the level of entrained air during initial mixing and subsequent high shear tests.

The following standard aqueous suspension, shown in Table I, was used to evaluate the effect of high shear on a sample of microspheres:

TABLE I

| Order Of Addition | Raw Material | Amount (grams) | Specific Gravity | Percent |
| --- | --- | --- | --- | --- |
| 1 | Water | 550 | 1.0 | 93.94% |
| 2 | Hi-Mar D-829 | 1.5 | N/A | 0.26% |
| 3 | LAPONITE ® RD | 14 | 2.0 | 2.39% |
| 4 | EXPANCEL ® | 20 | 0.15 | 3.42% |

Based upon the amount of raw materials used and their corresponding specific gravities, the theoretical densities of the aqueous suspension with and without microspheres are calculated and listed in Table II:

TABLE II

| Theoretical Density without Microspheres | 8.45 lb/gal | (1.01 g/cc) |
| --- | --- | --- |
| Theoretical Density with Microspheres | 7.06 lb/gal | (0.85 g/cc) |

The Hi-Mar D-829 defoamer was stirred slightly into 550 grams of room temperature (73° F.) water followed by the addition of 14 grams of LAPONITE® RD hydrous magnesium silicate. The solution was mixed for 20 minutes under high shear using the HAMILTON BEACH® Model 930 Mixer at which point the density of the solution was measured using a Gardco U.S. Standard Weight Per Gallon Cup and found to be 8.436 pounds per gallon (1.0106 g/cc). Twenty grams of EXPANCEL® 091WE microspheres were hand mixed into the clear thickened liquid, being careful to minimize the entrainment of air. The density of the microsphere suspension was taken using the Gardco U.S. Standard Weight Per Gallon Cup prior to high shear mixing. The suspension was then mixed under high shear using the HAMILTON BEACH® Model 930 Mixer in two-minute increments. Each two-minute segment was followed by a density measurement to determine the survival of the microspheres. Table III shows the measured density for the suspension of microspheres before and after each two-minute high shear exposure.

TABLE III

| | Density | | |
| --- | --- | --- | --- |
| Mixing Time, Minutes | pounds per gallon | (g/cc) | % Volume Decrease |
| 0 Minutes | 6.569 | (0.7870) | |
| 2 minutes | 6.632 | (0.7945) | 0.75% |
| 4 minutes | 6.666 | (0.7986) | 1.15% |
| 6 minutes | 6.671 | (0.7991) | 1.21% |
| 8 minutes | 6.672 | (0.7993) | 1.22% |

Table IV summarizes the preferred microsphere properties for use as filler in the manufacture of a lightweight joint compound.

TABLE IV

| | PACN, PVDC. |
| --- | --- |
| Microsphere Shell Composition | With or Without MMA |
| Particle Size (Weight Average Diameter) | 25–55 Microns |
| Density (g/cc) | 0.009–0.13 |
| Highly Dispersible in Water | Yes |
| Non Friable | Yes |
| Shear Stable | Yes |
| Solvent Resistant | Yes |
| Available in "Wet Cake Form" | Yes |
| Percent Solid Content of Wet Cake Form | 10–30 |

The most preferred polymer resin used in the manufacture of microspheres is PACN, such as that used in EXPANCEL® 091 WE from Nobel Industries, Sweden. The resin shell of this microsphere has demonstrated acceptable resistance to stress, caused by the shear force of mixing and pressures during material transfer in the manufacture of joint compound. The average particle size of this microsphere is less than 75 microns, and when employed in a lightweight formulation, the resulting material demonstrated a smooth, non-grainy surface. The microspheres are also provided in a pre-wet cake (10% by weight) that is particularly easy to disperse in water. PVDC is optionally used in combination with PACN, or alone, in the manufacture of the microspheres. In some cases, MMA is employed, in combination with PVDC and/or PACN.

A coated microsphere, as taught in U.S. Pat. Nos. 4,722, 943 and 5,342,689, herein incorporated by reference, is also available. The coating acts as a free flowing aid during the manufacturing process and subsequent use, but the coating adds greatly to the density of the material, thus requiring greater concentrations to achieve equal drops in overall joint compound formulation density. The formulation is preferably adjusted to compensate for the increased level of coating agent used on the microspheres, however, this will require additional processing time and equipment.

The joint compound of the present invention includes the resin microspheres as one of the fillers to be used. Use of additional fillers is preferred to import specific properties to the joint compound. The preferred additional filler, particularly for drying type formulations, is finely ground calcium carbonate. It is a dry powder that usually comprises at least about 50% by dry weight of the joint compound composition and generally falls within the range of about 50–98% of the dry weight. Additional fillers such as mica, talc, such as sericite, diatomaceous earth, clays, such as attapulgite, sepulite and kaolin, calcium sulfate dihydrate, calcium sulfate anhydrite, calcium sulfate hemihydrate, and pyrophylite are also suitable. The ratio of all fillers to all binders is preferably in the range of from about 15:1 to about 5:1.

Perlite or expanded perlite is another lightweight filler which may be used in addition to the microspheres where the weight of the compound is important, and is used in the lightweight formulation of the preferred embodiment. Use of expanded perlite in a lightweight joint compound is taught in U.S. Pat. No. 4,454,267, which is herein incorporated by reference. Expanded perlite is a very lightweight material that contains many cracks and fissures. It should be treated according to the teachings of U.S. Pat. No. 4,525,388, which is hereby incorporated by reference, so that the material does not increase in weight due to water absorbed by capillary action. The treated, expanded perlite, when used, is preferably present in concentrations of at least 5% based on the weight of all ingredients of the joint compound, excluding water.

Bonding between the joint compound and the substrate is improved by the addition of thickeners, plasticizers and/or polyvinyl alcohol powder. Cellulosic thickeners are preferred, with METHOCEL® 240S providing the best results. Conventional cellulosic thickeners, such as ethylhydroxy ethylcellulose, hydroxypropyl methylcellulose, methylhydoxypropyl cellulose and hydroxyethyl cellulose, are also suitable in the joint compounds of this invention. The concentration of cellulosic thickener ranges from about 0.05% to about 2% of the dry weight of the joint compound ingredients.

Polyethylene glycol ("PEG") and/or methoxypolyethylene glycol may optionally be added to the present joint compound. Either of these additives can be used to control the surface absorption properties of the cured joint compound. These additives also improve the wetness and slip of the material. When used, the PEG is added in a concentration ranging from about 0.1% to 2% of the dry weight of the joint compound.

Other preferred additives of the present joint compound include surfactants, wetting agents, soaps and alkyl benzene sulfonates. A soap, or detergent, is a complex mixture of ingredients including, but not limited to acids, bases, antimicrobal agents, antiredeposition agents, colorants, fragrances, defoamers, foamers, hydrotropes, moisturizers, preservatives, solvents, thickeners or surfactants, selected from many possible functional groups. Alkyl benzene sulfonate is a specific surfactant that is particularly useful in formulations of this nature, as taught in co-pending application U.S. Ser. No. 09/724,674, now U.S. Pat. No. 6,476,099, filed concurrently herewith, for a Joint Compound Additive for Reduction of Cracking, Cratering and Shrinkage, which is herein incorporated by reference. The preferred joint compound of this invention utilizes sodium dodecyl benzene sulfonate to improve several properties of the joint compound including, crater resistance, crack resistance, and shrinkage reduction. In lightweight joint compounds, soaps and alkyl benzene sulfonates also help to decrease the density of the joint compound.

Using the formulation of the present invention significant reduction in density of joint compounds is attainable. A preferred product density is less than 8.35 pounds per gallon, less than the density of water. In the most preferred embodiment, products with densities less than 8pounds per gallon are obtained.

Use of the resin microspheres also results in a joint compound with a different scent compared to a traditional joint compound. If desired, fragrance, such as a vanilla extract, may be added to make the scent of the joint compound more agreeable.

Water is added to the ready-mix joint compound to achieve the correct viscosity. However, when making lightweight formulation, care should be take to minimize the amount of water in the compound. Water adds to the density of the product when the desired finished product density is less than that of the water itself. In addition, when the level of water is minimized, resistance to shrinkage and cracking is enhanced. When the microspheres are coated to aid in dispersion, the coating also contributes to the overall weight of the joint compound. It may be necessary to reduce the overall level of fillers in the formulation to compensate for the percentage of coating agent added to the microspheres.

Preparation of the ready-mix joint compound with pre-wet resin microspheres cake requires a different processing method compared to a joint compound with traditional fillers. Traditionally, wet and dry components are added and mixed separately prior to transfer to a main wet mixer. When the microspheres are supplied in a pre-wet cake, they tend to clog the transfer lines of the wet component system because of the their inherent lightweight nature. The wet filler cake also causes lumping when introduced into the dry component system, as the dry components tend to wet out when in contact with the filler cake, which is as high as 90% moisture. To prevent clogging, contamination of the transfer lines, and lumps of pre-wet dry additives, the resin microspheres are added directly to the main mixer, separate from the other ingredients. In the addition of the microspheres, timing is not critical. Microspheres are suitably added before, during or after the addition of other components, as long as they are not added as part of the wet component group or the dry component group.

If desired, the pre-wet resin cake may be first dispersed in water then pumped directly into the main mixer. The resin microspheres are considerably lighter than water, and will have a great tendency to float on the surface of the water. Therefore it is important to thoroughly mix the slurry to keep it dispersed during pumping to the main mixer. Water used to fluidize the wet filler cake is subtracted from the mix water usually added directly to the main mixer. The amount of water in the final ready-mix joint compound product must be adjusted accordingly.

Although the dry powder form of the resin microspheres may be mixed with other dry ingredients, care must be taken since the spheres density is so low. They readily disperse into the air, forming a cloud that settles slowly. It is preferred that the powder be handled so as to minimize release into the air.

Mixing of the joint compound is preferably carried out at a lower shear compared to traditional joint compounds. High viscosity mixing creates higher shear on the spheres. The density of the joint compound increases when microspheres break. Care should be taken to assure that there is minimal breakage by keeping the shear stress of mixing below the point at which the microspheres shell walls can be compromised.

Use of a vacuum to remove entrained air prior to transfer to the filling station negatively affects this joint compound. If the wall strength of the microspheres is exceeded when the vacuum is applied, the microsphere's shell will be stressed, leading to collapse and resulting in densification of the joint compound. An increase in density specifically between the main mixer and the fill station results when the vacuum is used, and is due to reduction in entrained air together with breakage of the microspheres. Manufacturing trials have shown that when the formulation is mixed at a lower viscosity, there is a tendency to entrain less air making in-transfer vacuum unnecessary.

The following examples are from a preliminary manufacturing trial. The objective of the trial was to determine the feasibility of incorporating lightweight resin microspheres into a ready mix joint compound manufacturing system.

EXAMPLE 1

(Comparative Example)

CGC All Purpose Lite Joint Compound, available from Canadian Gypsum Co., Calgary, Alberta, was selected as a control ready-mixed, all-purpose joint compound and was benchmarked for comparative purposes. The formulation did not contain hollow thermoplastic resin microspheres, polyethylene glycol, or alkyl benzene sulfonate.

Testing of the control involved benchmarking the mixer and fill station densities as well as viscosity measurements, as shown in Table V.

TABLE V

Control Batch Plant Test Data

| | | |
|---|---|---|
| Mixer Density | 8.58 ppg | (1.03 g/cc) |
| Filler Station Density | 9.62 ppg | (1.15 g/cc) |
| Mixer Viscosity | 375 Brabender Units | |
| Fill Station Viscosity | 560 Brabender Units | |

Further testing was conducted in the laboratory, and is detailed in Table VI. Density was determined by using a Gardner Weight Per Gallon Cup. Hardness was tested with a modified 414 Durometer on a panel of dry joint compound ⅛" thick. Application properties of the joint compound were tested both by hand trowel and with applicator tools. Ease of application was subjectively judged on a scale of 1–10, with 10 being the best.

TABLE VI

Control Batch Laboratory Data

| | |
|---|---|
| Test Viscosity, Brabender Units | 300 |
| Solids | 53.49% |
| Shrinkage | 20.03% |
| Calculated Density | 9.03 ppg (1.08 g/cc) |
| Actual Density | 9.11 ppg (1.09 g/cc) |
| Hand Trowel Application Properties | 8 |
| Tool 10" Ames Box Application Properties | 7 |
| Room Temperature Adhesion | Excellent |
| Cold Climate Adhesion | Poor |
| Hot Climate Adhesion | Good |
| Average ⅛" Surface Hardness | 84.3 |
| Presence of Fissure Cracks After Drying | None |
| Presence of Check Cracks After Drying | Minor |

Adhesion tests were carried out at specific temperatures and humidity levels. Adhesion test specimens were allowed to cure for 24 hours in each control environment. The Room Temperature Adhesion test was run at 75° F. and 50% relative humidity. Cold and hot climate tests were conducted at 40° F. at 80% relative humidity and 90° F. and 90% relative humidity, respectively.

EXAMPLE 2

The following trial batch formulation was evaluated to determine the feasibility of manufacturing a ready mixed joint compound containing lightweight hollow resin microspheres.

TABLE VII

Example 2 Formulation

| Raw Materials | lbs. | (kg) | Percentage |
|---|---|---|---|
| IMASCO ® 200 | 1468 | (667) | 74.07% |
| SILBRICO ® #35-34 | 242 | (110) | 12.21% |
| Super Gel B | 75 | (34) | 3.78% |
| METHOCEL ® 240S | 11 | (5) | 0.55% |
| METHOCEL ® J75MSN | 6 | (2.7) | 0.30% |
| Polyvinol BPO5S | 4 | (1.8) | 0.20% |
| Sodium Nitrite | 2.11 | (.96) | 0.11% |
| AMICAL ® 48 | 0.38 | (.17) | 0.02% |
| NACAN ® 78-5692 | 112 | (51) | 5.65% |
| NUOSEPT ® 95 | 2.5 | (1.14) | 0.13% |
| CARBOWAX ® 8000 | 17 | (7.7) | 0.86% |
| EXPANCEL ® 091WE | 42 | (19.1) | 2.12% |
| Total Dry Weight | 1981.99 | (900.9) | |
| Mix Water Added | 1318.51 | (599.32) | |
| Theoretical Density | 8.401 ppg | (1.006 g/cc) | |

Two and one half bags, each bag containing approximately 18.8 wet pounds (8.5 kg.) of EXPANCEL® 091WE microspheres, were added individually and each mixed with 25 gallons (94.6 l) of water in a 50 gallon (189.1 l) stainless steel tank. A standard LIGHTING® mixer with a three-inch propeller type agitator was used to mix the microspheres until homogeneous slurry was observed. It was observed that a large layer of the resin microspheres was floating on top of the tank liquid, leading to a concern that insufficient mixing was taking place. In subsequent examples, a second propeller mixer was added to insure proper mixing of the surface layers. Water used to disperse the microspheres was subtracted from the first water typically added to the main mixer. Dry bulk ingredients were weighed and placed into a dry bin. Non-bulk dry additives such as the fungicide, were measured and placed into a bag dump, then transferred to the dry bin. Additives in the dry bin were mixed prior to transfer to the main wet mixer. Bulk liquid ingredients were metered into a holding tank. The contents of both the liquid holding tank and the dry mixer were transferred to the large main wet mixer along with the microsphere slurry and enough water such that the additives when mixed formed a soft, dough-like consistency. A second portion of water was then added to obtain the optimal mixing viscosity. Trim water was then added to fine-tune the product viscosity prior to packaging.

TABLE VIII

Example 2 Plant Test Data

| | |
|---|---|
| Mixer Density | 7.39 ppg (0.885 cc/g) |
| Fill Station Density | 7.82 ppg (0.937 cc/g) |
| Mixer Viscosity | 390 BU |
| Fill Station Viscosity | 530 BU |

Further testing was conducted in the laboratory. The following Table IX lists the results.

TABLE IX

Example 2 Laboratory Test Data

| | |
|---|---|
| Test Viscosity, Brabender Units | 300 |
| Solids | 49.40% |
| Shrinkage | 16.04% |

TABLE IX-continued

Example 2 Laboratory Test Data

| | |
|---|---|
| Theoretical Density | 8.401 ppg (1.006 g/cc) |
| Actual Density | 8.331 ppg (.998 g/cc) |
| Hand Towel Application Properties | 10 |
| Tool 10" Ames Box Application Properties | 8 |
| Room Temperature Adhesion | Excellent |
| Cold Climate Adhesion | Poor |
| Hot Climate Adhesion | Excellent |
| Average 1/8" Surface Hardness | 82.3 |
| Presence of Fissure Cracks After Drying | None |
| Presence of Check Cracks After Drying | None |

Example 3 is from a second manufacturing trial. The objective of the trial was to determine the optimal main mixer viscosity, improve microsphere dispersion and reduce mixing time through the addition of a second agitator to the microsphere premix tank, increase batch size to better utilize the volume of the main mixer, and study the feasibility of introducing the polyethylene glycol into the premix tank with the microspheres versus the dry additives system.

EXAMPLE 3

The following trial batch formulation was evaluated:

TABLE X

Example 3 Formulation

| Raw Materials | lbs. | (kg.) | Percentage |
|---|---|---|---|
| IMASCO ® 200 | 1545 | (702) | 74.13% |
| SILBRICO ® #35–34 | 255 | (116) | 12.24% |
| Super Gel B | 79 | (36) | 3.79% |
| METHOCEL ® 240S | 12 | (5.5) | 0.58% |
| METHOCEL ® J75MSN | 6 | (2.7) | 0.29% |
| Polyvinyl BPO5S | 4.2 | (1.9) | 0.20% |
| Sodium Nitrite | 2.22 | (1.0) | 0.11% |
| AMICAL ® 48 | 0.4 | (.18) | 0.02% |
| NACAN ® 78–5692 | 118 | (53.6) | 5.66% |
| NUOSEPT ® 95 | 2.6 | (1.2) | 0.12% |
| CARBOWAX ® 8000 | 17.7 | (8.0) | 0.85% |
| EXPANCEL ® 091WE | 42 | (19.1) | 2.02% |
| Total Dry Weight | 2084.12 | (947.33) | |
| Mix Water Added | 1518.79 | (690.36) | |
| Theoretical Density | 8.487 ppg | (1.017 g/cc) | |

EXPANCEL® microspheres and PEG were pre-slurried in water, using 2.5 bags of EXPANCEL® microspheres 17.7 lbs. (8.0 kg.) of PEG. First the microspheres were slurred with 85 gallons (321.725 l) of water, then approximately 20 gallons (76 l) of water was added with the PEG for a total of 105 gallons (397 l). A first water of 57 gallons (216 l), not including the pre-slurried water, was also added bringing the total initial water to 162 gallons (613 l). The addition of 19 gallons (72 l) to the main mixer saw the final water be 182 gallons (689 l).

TABLE XI

Example 3 Plant Test Area

| | | |
|---|---|---|
| Mixer Density | 7.67 ppg | (.919 g/cc) |
| Fill Station Density | 8.25 ppg | (.988 g/cc) |
| Mixer Viscosity | 300 BU | |
| Fill Station Viscosity | 420 BU | |
| 24 Hour Viscosity | 600 BU | |
| 48 Hour Viscosity | 680 BU | |
| 72 Hour viscosity | 700 BU (Stable) | |

Further testing was conducted in the laboratory. Table XII lists the results.

TABLE XII

Example 3 Laboratory Test Data

| | |
|---|---|
| Test Viscosity | 300 BU |
| Solids | 52.19% |
| Shrinkage | 15.57% |
| Theoretical Density | 8.487 ppg (1.017 g/cc) |
| Actual Density | 8.08 ppg (.968 g/cc) |
| Hand Trowel Application Properties | 10 |
| Tool 10" Ames Box Application Properties | 8 |
| Room Temperature Adhesion | Excellent |
| Cold Climate Adhesion | Fair |
| Hot Climate Adhesion | Not Tested |
| Average 1/8" Surface Hardness | 84.6 |
| Presence of Fissure Cracks After Drying | Very Minor |
| Presence of Check Cracks After Drying | None |

The following example, Example 4, is from a third manufacturing trial. The objective of the trial was to manufacture test material to evaluate in the field, add fragrance to enhance the smell of the formulation, and to evaluate if the addition of alkyl benzene sulfonate improves the application properties of the formulation.

EXAMPLE 4

The preferred formulation is described in Table XIII.

TABLE XIII

Example 4 Formulation

| Raw Materials | lbs. | (kg.) | Percentage |
|---|---|---|---|
| IMASCO ® 200 | 1532 | (696) | 72.91% |
| SILBRICO ® #35–34 | 255 | (116) | 12.14% |
| Super Gel B | 91 | (41.4) | 4.33% |
| METHOCEL ® 240S | 12 | (5.5) | 0.57% |
| NATROSOL ® 250 HXR | 6 | (2.7) | 0.29% |
| Polyvinyl BPO5S | 4.2 | (1.9) | 0.20% |
| Sodium Nitrite | 2.22 | (1.0) | 0.11% |
| AMICAL ® 48 | 0.4 | (.18) | 0.02% |
| NACAN ® 78–5692 | 118 | (53.6) | 5.62% |
| NUOSEPT ® 95 | 2.6 | (1.2) | 0.12% |
| Vanilla Extract | 0.83 | (.38) | 0.04% |
| WITCONATE ® 90 | 2 | (0.9) | 0.10% |
| CARBOWAX ® 8000 | 17.7 | (8.0) | 0.85% |
| EXPANCEL ® 091WE | 42 | (19.1) | 2.02% |
| Total Dry Weight | 2084.12 | (947.33) | |
| Mix Water Added | 1518.79 | (690.36) | |
| Theoretical Density | 8.487 ppg | (1.017 g/cc) | |

Table XIV reflects the combined test results from the manufacturing plant and the laboratory. The results indicate that the formulation has preferred application and physical properties over the control ready mixed all purpose joint compound while achieving a density less than that of water.

TABLE XIV

Example 4 Plant and Laboratory Test Results

| | |
|---|---|
| $1^{st}$ Water (gal) | 110 (416 l) |
| $2^{nd}$ Water (gal) | 177 (670 l) |
| Mixer Viscosity (BU) | 290 |
| Mixer Density (ppg) | 6.98 (.836 g/cc) |
| Viscosity Fill Station (BU) | 380 |
| Density Fill Station (ppg) | 8.31 (.996 g/cc) |
| % Solids | 56.7% |
| % Shrinkage | 14.79% |
| 90° F./90 R.H. | Good |
| 75° F./50 R.H. | Excellent |
| 40° F./80 R.H. | Fair |

TABLE XIV-continued

Example 4 Plant and Laboratory Test Results

| | |
|---|---|
| Average Surface Hardness | 85 |
| Fissure Cracks | None |
| Check Cracks | None |
| Hand Trowel Application Properties | 10 |
| Tool 10" Ames Box Application Properties | 10 |

The above data shows that significant reduction in joint compound density is obtainable with low shrinkage, no cracking, and reduced cratering using the joint compound of the present invention.

A description and source for materials used in the above examples is contained in Table XV.

TABLE XV

| Description | Trade Names | Source |
|---|---|---|
| Calcium Carbonate | IMASCO ® 200 | Imasco Minerals Inc., Surry, B.C. |
| Expanded Perlite | SILBRICO ® 35–34 | Silbrico Corp., Hodgkins, IL |
| Attapulgite Clay | Super Gel B | Milwhite Corp., Houston, TX |
| Cellulosic Thickener | METHOCEL ® 240S | Dow Chemical Co., Midland, MI |
| Thickener | NATROSOL ® 250 | HXR Hercules, Palatine, IL |
| Polyvinyl Alcohol | BP-05S | Perry Chemicals, Whitestone, NY |
| Cellulosic Thickener | METHOCEL ® J75MSN | Dow Chemical Co., Midland, MI |
| Fungicide | AMICAL ® 48 | Angus Chemical, Buffalo Grove, IL |
| Polyvinyl Acetate Emulsion | NACAN ® 78–5692 | National Starch Bridgewater, NJ |
| Bacteriocide | NUOSEPT ® 95 | Creanova, Inc., Des Plaines, IL |
| Dodeyl Benzene Sulfonate | WITCONATE ® 90 | Witco Chemicals, Houston, TX |
| Polyethylene Glycol | CARBOWAX ® 8000 | Union Carbide Corp., Danbury, CT |
| Acrylonitrite Resin Microbubbles | EXPANCEL ® 091WE | Akzo Nobel, Stratford, CT |

While a particular embodiment of the present invention has been shown and described, it will be appreciated by those skilled in the art that changes and modifications may be made thereto without departing from the invention in its broader aspects and as set forth in the following claims.

We claim:

1. A joint compound comprising a binder that enhances adhesion of said joint compound to a substrate, water and one or more fillers, wherein at least one of said fillers comprises hollow resin microspheres having a mean particle size of less than 75 microns, exhibits no more than 1.5% increase in density under high shear stress testing, and is present in a concentration sufficient to obtain a joint compound density less than that of water, and wherein said binder is present in concentrations of from about 1% to about 3.5% wet weight.

2. The joint compound of claim 1, further comprising a fragrance.

3. The joint compound of claim 2, wherein said fragrance comprises vanilla extract.

4. The joint compound of claim 1, wherein said microspheres have a mean particle size of about 25 to about 55 microns.

5. The joint compound of claim 1 further comprising a hydrocarbon substituted sulfate, sulfonate, sulfuric acid or sulfonic acid, wherein said hydrocarbon is an aliphatic, olefinic, alicyclic or aromatic group, or a mixture of two or more thereof, having from 12 to 24 carbon atoms.

6. The joint compound of claim 5, wherein said hydrocarbon is dodecyl benzene.

7. The joint compound of claim 1, wherein said binder comprises a latex binder.

8. The joint compound of claim 1, wherein said fillers further comprise expanded perlite.

9. The joint compound of claim 1 further comprising polyethylene glycol or methoxypolyethylene glycol.

10. The joint compound of claim 9, wherein said polyethylene glycol or methoxypolyethylene glycol is present in concentrations from about 0.5 to about 2% by weight of the solids on a dry basis.

11. The joint compound of claim 1 further comprising a second filler, said second filler comprising calcium carbonate, calcium sulfate dihydrate or a combination thereof.

12. The joint compound of claim 11, wherein said second filler comprises calcium carbonate.

13. The joint compound of claim 1, wherein said resin microspheres comprise acrylonitrile copolymer microspheres.

14. A joint compound composition comprising:
   a latex binder to enhance adhesion of said joint compound to a substrate, said binder being present in concentrations of from about 1% to about 3.5% wet weight;
   water;
   a thickener;
   a preservative;
   a dispersing agent;
   a calcium carbonate filler;
   dodecyl benzene sulfonic acid or a dodecyl benzene sulfonate salt; and
   hollow acrylonitrile copolymer microspheres having a mean particle size of less than 75 microns, exhibiting no more than 1.5% increase in density under high shear stress testing and being present in a concentration sufficient to obtain a joint compound density less than that of water.

15. The joint compound of claim 14, wherein said microspheres have a mean particle size of 25–55 microns.

16. A process of making a joint compound comprising:
   grouping components of said joint compound into wet components and dry components, said components comprising a binder to enhance adhesion of said joint compound to a substrate, water, a thickener, a preservative, a dispersing agent and one or more fillers, and wherein said binder is present in concentrations of from about 1% to about 3.5% wet weight;
   mixing said wet components together;
   mixing said dry components together;
   combining said wet and said dry components together in a main mixer;
   adding hollow resin microspheres directly to said main mixer, said microspheres having a mean particle size of less than 75 microns, exhibiting less than 1.5% decrease in volume under high shear stress testing and being present in a concentration sufficient to obtain a joint compound density less than that of water; and
   mixing until said joint compound is homogeneous.

17. The process of claim 16 wherein a portion of said dry components are pre-measured and placed in a bag dump.

18. The process of claim 16 further comprising predispersing said resin microspheres in water prior to said addition step.

\* \* \* \* \*